UNITED STATES PATENT OFFICE.

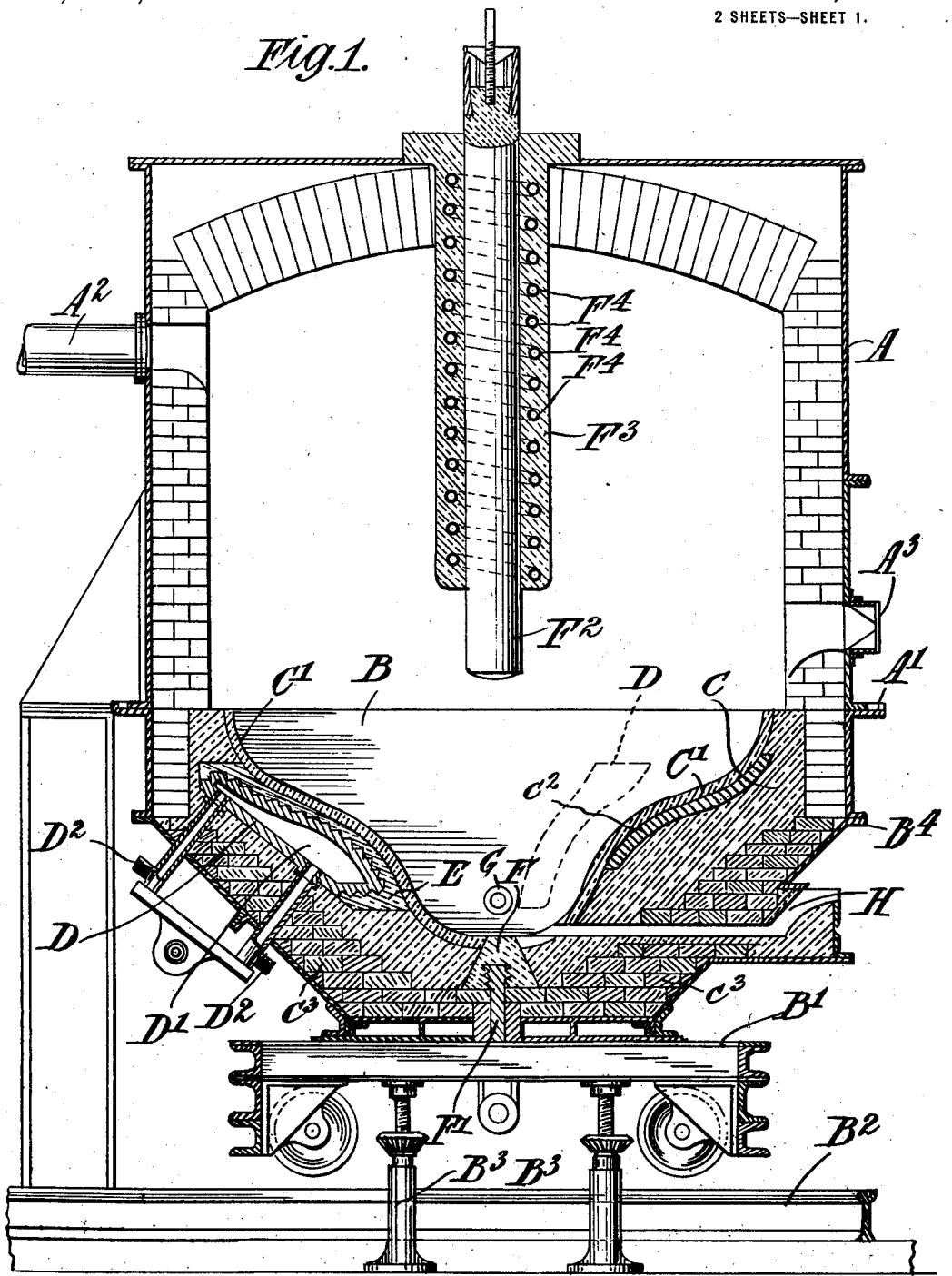

FRANK WILLIAM HIGHFIELD, OF CAVERSHAM, ENGLAND.

SMELTING OF ORES AND APPARATUS THEREFOR.

1,167,176.  Specification of Letters Patent.  Patented Jan. 4, 1916.

Application filed February 23, 1915. Serial No. 10,052.

*To all whom it may concern:*

Be it known that I, FRANK WILLIAM HIGHFIELD, a subject of the King of England, residing at Caversham, Oxford, England, have invented certain new and useful Improvements in the Smelting of Ores and Apparatus Therefor, of which the following is a specification.

This invention relates to the treatment of ores, and in particular to the treatment of complex sulfid ores, under circumstances in which electrical power is readily available, or is cheap.

The present invention comprises a process and apparatus for carrying out the process.

According to the present invention I provide a process for reduction of complex sulfid ores consisting in roasting a charge by combustion with or without the aid of a blast to remove sulfur. I then add reducing material to effect partial reduction and thereafter add further reducing material and heat the charge by electrical means while in a reducing atmosphere without air blast, to recover the metal. Preferably, all the said steps are carried out in one and the same hearth for the purpose of economy in labor, or in heat, or both. I further prefer to add to the steps of the above described process one in which diverse metallic contents of the hearth are, while in the fluid state, electrically separated from one another.

In order to carry out the above process I provide a smelting furnace having a hearth for roasting the charge by combustion thereof, with means for electrically heating the charge in that hearth. The hearth is preferably lined with material which is an electrical conductor of the second class, and in which electrodes are embedded to introduce current into the charge. Moreover, preferably there are provided means to cause arc-heating and also means electrically to produce separation of diverse fluid metallic contents of the hearth from one another.

One embodiment of this invention is now described by way of example and with reference to the accompanying drawings, in which:—

Figure 3:
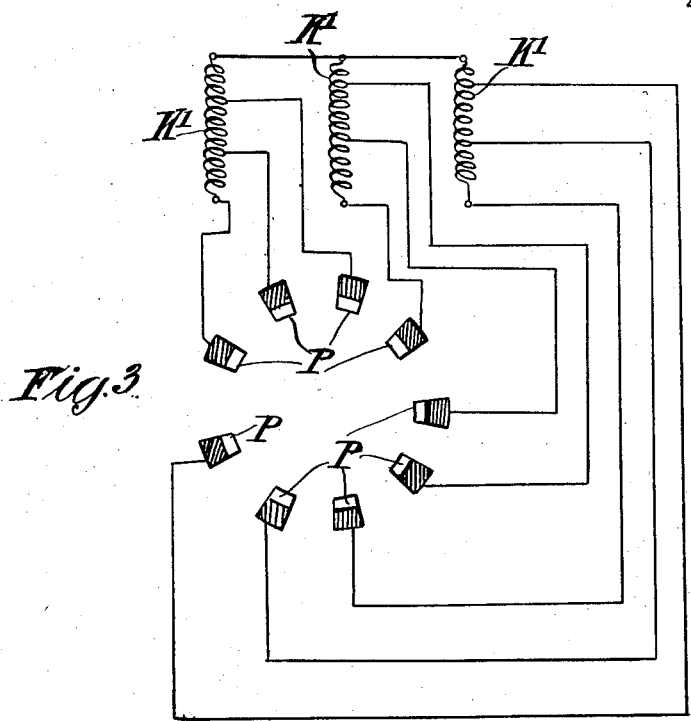
Figure 2:
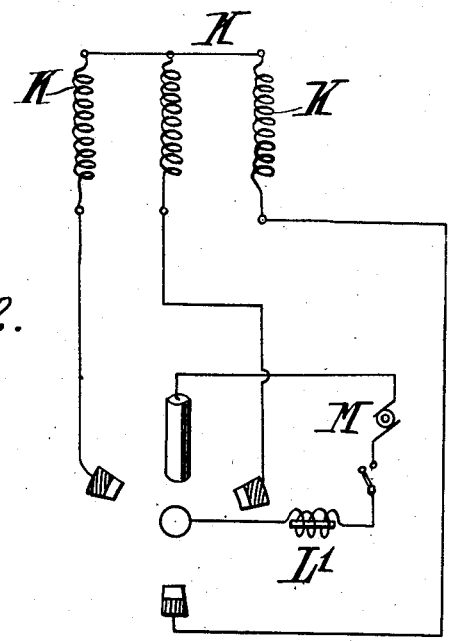

Figure 1 is a vertical central section through the furnace; Fig. 2 is a diagram of its electrical connections; and Fig. 3 is a diagram of further electrical connections as a modification.

The furnace is provided with a cylindrical body A and a saucer-shaped hearth B. The hearth is supported upon a wheeled structure $B^1$ adapted to run upon rails $B^2$ and to be held up against the body A by jacks $B^3$ to make joint with the body at $A^1$. One or more outlet pipes for gaseous products are provided, one being seen at $A^2$. A slag tap is provided as usual but is not shown, and an inspection door is provided as at $A^3$. The hearth has a cast iron body $B^4$ lined with silica or fire clay brick $C^3$ and with an inner lining C of refractory material of the so-called second class of electrical conductors, such for example as magnesite, chromite or dolomite. The inner lining is molded to give the hearth a saucer-shaped form not unlike that of a shallow parabola. The hearth is provided with three electrodes D of cast iron or steel set 120° apart around the hearth midway between its upper edge and its bottom; each electrode is made hollow as at $D^1$ and is provided with pipes $D^2$ for the circulation of cooling water. Its outer face is ribbed or grooved to provide increased contact surface and an envelop E of graphite or carbonaceous material is molded on it so that that face of the envelop which is toward the hearth is in contact with the outer surface of the inner lining C. After the electrodes are fixed in position in the inner lining of the hearth, I prefer to coat the inner surface with a paint of commercial carborundum and water glass or glue in the proportions of 3 to 1 by weight, this mixture being thinned out with water and painted on to the lining to a depth of several millimeters, and when this carborundum mixture has dried on to the walls of the hearth I prepare an intimate mixture of finely pulverized coke, commercial carborundum and fused magnesia in the proportions of 3–4–3 by weight, which is molded as seen at $C^2$ on to that portion or zone of the hearth that is immediately between and inclosed by the electrodes. When this mixture has dried in position I prefer to give it a wash of carborundum and water glass as before applied, and then to coat the whole of the interior of the hearth with an innermost lining $C^1$ consisting of a mixture of coarse calcined magnesite, fireclay, and fine caustic magnesite, this material being pulverized and molded into position to a depth of 2 or 3 inches and finally rammed down with hot rammers; the hearth is thoroughly and slowly dried and then painted with a mixture of siloxicon and water to a depth of 1 or 2 millimeters.

The lining C, the resistance composition $C^2$ and the lining $C^1$ are all such that they have approximately the same coefficient of expansion.

A central electrode F of carbonaceous material is provided in the bottom of the hearth molded on to an iron core $F^1$ in which, if desired, provision may be made for water cooling. To coöperate with this electrode is an electrode $F^2$ depending from the roof of the body of the furnace and passing through a fire clay bush $F^3$, within which is embedded a coiled pipe $F^4$ for water cooling. Twyers are provided for the hearth, of which one is shown at G and a lead siphon is provided, as seen at H; one or more matte taps are provided at suitable heights as required but are not shown in the drawing. The electrical connections are thus seen in Fig. 2 where K K K are the secondary windings of a three-phase transformer, $L^1$ a choking coil and M a direct current generator.

The process according to this invention will now be described as carried out with an ore of the following approximate composition: Sulfur 20%, zinc 15%, lead 10%, iron 11%, silicon 35%, copper 4%, silver about 20 ounces to the ton. The ore is crushed and dressed in the usual manner and mixed with about 15 to 20% by weight of pulverized limestone, and slightly damped and charged into the furnace in small quantities, a fire having been previously kindled in the hearth by any convenient means. The blast is now turned on at about 5 to 8 ozs. this being increased to about 15 ozs. when the hearth has a full charge of ore. Desulfurization will now become active throughout the charge and dense fumes of $SO_2$ be given off, which escape by the opening in the combustion chamber and are preferably utilized for the production of sulfuric acid, or for breaking up into sulfur and oxygen. The charge must be frequently rabbled to prevent agglomeration as far as possible, and to present fresh surfaces to the heated blast. This operation is continued for about 10 hours or until the charge contains about 3 to 5% of sulfur only. The blast pressure is now reduced and the temperature of the hearth will by this time be about 300° C. and the lining in the hearth will be sufficiently hot to form a high resistance circuit between the electrodes embedded in it. Current is then switched on to the electrodes in the hearth which, with its contents, is thus heated electrically, and the current is kept at a constant value by varying the connections of transformers connected to the electrodes or in any other desired manner. The temperature is by this means kept under control. At this stage the blast is entirely shut off, charcoal or coke, and iron, are added to the charge, and the temperature gradually raised to about 950° C. by the electrical heating. At this temperature the zinc content of the charge is volatilized and the lead reduced to the metallic state. The volatilized zinc oxid escapes through the opening previously referred to, and is treated in any desired manner for recovery or use; the lead content is drawn off, leaving a matte containing iron and copper.

I find that the charge, when sufficiently fluid, rotates under the action of the three-phase current, and this rotational effect is valuable as a stirring effect. The temperature is now increased until the formation temperature, that is about 1300° C., is reached of the silicious slags. At this point the electrode $F^2$ is lowered so as to make contact with the contents of the hearth. The electrode forms the positive pole of a direct current circuit, the current being led away by means of the electrode F. The action of the direct current is, first to produce an arc at the surface of the molten contents of the hearth, and so promote fluidity of the slag, and next to effect also a partial decomposition of the copper and iron compounds which consist largely of sulfids in the matte by electrical action, with the consequent separation from the slag of a matte containing metallic copper and iron. When the several reactions have been carried as far as is practical, the slag is tapped out into slag pots, and the metals tapped into a forehearth for further separation by any convenient means.

During the process of electrical separation by direct current, the three-phase current is maintained in order to preserve the fluidity of the charge.

In order to promote and accentuate the above described rotational effect auxiliary electrodes may be placed in position intermediate between the main electrodes D in the hearth. These are embedded in the lining of the hearth in the same manner as the electrodes D and may be of any size and number found convenient. In Fig. 3 an arrangement of 9 such auxiliary electrodes is illustrated, the electrodes being marked P and being connected to the secondaries $K^1$, $K^1$, $K^1$ of a three-phased transformer by means of tappings as shown.

An important feature of this invention is the step in which after oxidation to drive off sulfur and subsequent partial reduction, the charge is heated electrically by means of the current carried by the lining $C^1$ of the hearth which has been rendered conductive by the heat generated in the preceding portions of the process. Although current will traverse this lining and give rise to heating it is not always confined to the lining but will, under suitable conditions, also traverse the charge in the hearth.

It is to be understood that the details hereinbefore given both of the process and of the apparatus may be variously modified by those skilled in the art, without departing from the spirit and scope of this invention.

What I claim as my invention and desire to secure by Letters Patent is:

1. The herein described process for the reduction of complex sulfid ores, which consists in roasting the ore to remove sulfur therefrom, mixing the roasted ore with a reducing agent and heating the charge electrically in a reducing atmosphere to a temperature below the volatilization point of lead but above that of zinc and sufficient to effect reduction of both lead and zinc in the presence of one another so that the zinc content is separated from the lead by being volatilized and recovered as vapor while the lead is not volatilized, separating the molten lead from the residual matte, and heating the said residual matte electrically to the temperature at which silicious slags are formed.

2. The herein described process for the reduction of complex sulfid ores which consists in roasting the ore to remove sulfur therefrom, mixing the roasted ore with a reducing agent and heating the charge electrically in a reducing atmosphere to a temperature at which the zinc content is volatilized while the lead is not, separating the molten lead from the residual matte, heating the said residual matte electrically to a temperature at which silicious slags are formed and subjecting the matte of copper and iron sulfids while it is still liquid to the action of a direct current to promote separation of its iron and copper contents and decomposition of the copper and iron sulfids.

3. The hereinbefore described process for the reduction of complex sulfid ores which consists in roasting the ore to remove sulfur therefrom, mixing the roasted ore with a reducing agent and heating the charge electrically in a reducing atmosphere to a temperature of 950° C. at which the zinc content is volatilized but the lead is not and the latter is thereby separated in a liquid condition from the former, separating the molten lead from the residual matte and heating the said residual matte electrically to a temperature of 1300° C. for the formation of silicious slag and subjecting the matte of copper and iron sulfids while it is still liquid to the action of a direct current to promote separation of its iron and copper contents and decomposition of the copper and iron sulfids.

4. An electric smelting furnace having a hearth consisting of a lowermost support of refractory material, a lining of refractory material belonging to the second class of electrical conductors molded on to the said lowermost support, electrodes embedded in the said lining of refractory material, a resistance composition formed of refractory material mixed with carbon so as to constitute a conductor which conducts when cold molded on to the said lining belonging to the second class of electrical conductors, and an uppermost lining formed of a composition which is a second class electrical conductor.

5. An electric smelting furnace having a hearth consisting of a lowermost support of silica, a lining of refractory material belonging to the second class of electrical conductors molded on to the silica support, electrodes embedded in the said lining of refractory material, a resistance composition formed of refractory material mixed with carbon so as to constitute a conductor which conducts when cold molded on to the said lining belonging to the second class of electrical conductors, and an uppermost lining formed of a composition which is a second class electrical conductor.

6. An electric smelting furnace having a hearth consisting of a lowermost support of refractory material, a lining of refractory material belonging to the second class of electrical conductors molded on to the said lowermost support, electrodes embedded in the said lining of refractory material mixed with carbon so as to constitute a conductor which conducts when cold molded on to the said lining, belonging to the second class of electrical conductors, and an uppermost lining formed of a composition which is a second class electrical conductor, the intermediate lining of refractory material belonging to the second class of electrical conductors, the resistance composition and the uppermost lining having approximately the same coefficient of expansion.

7. An electric smelting furnace having a hearth consisting of a lowermost support of silica, a lining of refractory material of the second class of electrical conductors molded on to the silica support, electrodes made hollow and provided with pipes for the circulation of cooling water embedded in the said lining of refractory material, a resistance composition formed of refractory material mixed with carbon so as to constitute a conductor which conducts when cold molded on to the said lining belonging to the second class of electrical conductors, and an uppermost lining formed of a composition which is a second class electrical conductor, the intermediate lining of refractory material belonging to the second class of electrical conductors, the resistance composition and the uppermost lining having approximately the same coefficient of expansion.

8. An electric smelting furnace having a hearth consisting of a lowermost support of silica, a lining of refractory material belonging to the second class of electrical conductors molded on to the silica support, cast iron electrodes having an envelop of carbonaceous material molded on to them embedded in the said lining of refractory material, the said electrodes being made hollow and provided with pipes for the circulation of cooling water, a resistance composition formed of refractory material mixed with carbon so as to constitute a conductor which conducts when cold molded on to the said lining formed of the second class of electrical conductors, and an uppermost lining formed of a composition which is a second class electrical conductor, the intermediate lining of refractory material belonging to the second class of electrical conductors, the resistance composition and the uppermost lining having approximately the same coefficient of expansion.

9. An electric smelting furnace having a hearth consisting of a lowermost support of silica, a lining of refractory material belonging to the second class of electrical conductors molded on to the silica support, cast iron electrodes having an envelop of carbonaceous material molded on to them embedded in the said lining of refractory material, the said electrodes being made hollow and provided with pipes for the circulation of cooling water, a resistance composition formed of refractory material mixed with carbon so as to constitute a conductor which conducts when cold molded on to the said lining formed of the second class of electrical conductors and an uppermost lining formed of a composition which is a second class electrical conductor, the intermediate lining of refractory material belonging to the second class of electrical conductors, the resistance composition and the uppermost lining having approximately the same coefficient of expansion, a central electrode in the bottom of the hearth, and an electrode depending from the roof of the body of the furnace to coöperate with the said central electrode.

10. An electric smelting furnace having a hearth consisting of a lowermost support of silica, a lining of refractory material belonging to the second class of electrical conductors molded on to the silica support, cast iron electrodes having an envelop of carbonaceous material molded on to them embedded in the said lining of refractory material, the said electrodes being made hollow and provided with pipes for the circulation of cooling water, a resistance composition formed of refractory material mixed with carbon so as to constitute a conductor which conducts when cold molded on to the said lining formed of the second class of electrical conductors, and an uppermost lining formed of a composition which is a second class electrical conductor, the intermediate lining of refractory material belonging to the second class of electrical conductors, the resistance composition and the uppermost lining having approximately the same coefficient of expansion, a central electrode of carbonaceous material molded on to an iron core provided with means for water-cooling the same in the bottom of the hearth, and an electrode depending from the roof of the body of the furnace and passing through a fire clay bush provided with means for water cooling it.

11. An electric smelting furnace having a hearth consisting of a lowermost support of silica, a lining of refractory material of the second class of electrical conductors molded on to the silica support, electrodes embedded in the said lining of refractory material, a resistance composition formed of finely pulverized carbon, carborundum and fused magnesia so as to constitute a conductor which conducts when cold molded on to the said lining formed of the second class of electrical conductors, and an uppermost lining formed of a mixture of coarse calcined magnesite, fire clay and fine caustic magnesite, the intermediate lining of refractory material belonging to the second class of electrical conductors, the resistance composition and the uppermost lining having approximately the same coefficient of expansion.

12. An electric smelting furnace having a hearth consisting of a lowermost support of silica, a lining of refractory material of the second class of electric conductors molded on to the silica support, electrodes embedded in the said lining of refractory material, a resistance composition formed of finely pulverized carbon, carborundum and fused magnesia, so as to constitute a conductor which conducts when cold, molded on to the said lining formed of the second class of electrical conductors, a coating of carborundum and water glass being formed between the resistance element and the lining, an uppermost lining formed of a mixture of coarse calcined magnesite, fire clay, and fine caustic magnesite with a coating of a mixture of siloxicon and water glass on the exposed surface of the lining, the intermediate lining of refractory material belonging to the second class of electrical conductors, the resistance composition and the uppermost lining having approximately the same coefficient of expansion.

13. An electric smelting furnace having a hearth consisting of a lowermost support of refractory material, a lining of refractory material belonging to the second class of electrical conductors molded on to the said lowermost support, electrodes embedded in the said lining of refractory material, a resistance composition formed of refractory material mixed with carbon so as to constitute a conductor which conducts when cold molded on to the said lining belonging to the second class of electrical conductors and an uppermost lining formed of a composition which is a second class electrical conductor, the hearth being provided with twyers and lead and matte taps at suitable heights.

In testimony whereof I have signed my name to this specification in the presence of two subscribing witnesses.

FRANK WILLIAM HIGHFIELD.

Witnesses:
HAROLD H. SIMMONS,
HARRY B. BRIDGE.